United States Patent
Uemura et al.

(10) Patent No.: US 9,185,623 B2
(45) Date of Patent: Nov. 10, 2015

(54) MOBILE STATION APPARATUS, COMMUNICATION SYSTEM, BASE STATION APPARATUS, CELL RESELECTION METHOD, CONTROL PROGRAM OF MOBILE STATION APPARATUS, AND INTEGRATED CIRCUIT

(75) Inventors: Katsunari Uemura, Osaka (JP); Hidekazu Tsuboi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 197 days.

(21) Appl. No.: 13/643,517

(22) PCT Filed: Apr. 7, 2011

(86) PCT No.: PCT/JP2011/058820
§ 371 (c)(1),
(2), (4) Date: Jan. 3, 2013

(87) PCT Pub. No.: WO2011/135998
PCT Pub. Date: Nov. 3, 2011

(65) Prior Publication Data
US 2013/0095838 A1  Apr. 18, 2013

(30) Foreign Application Priority Data

Apr. 26, 2010 (JP) .................................. 2010-101313

(51) Int. Cl.
*H04W 36/30* (2009.01)
*H04W 4/06* (2009.01)
(Continued)

(52) U.S. Cl.
CPC ................ *H04W 36/30* (2013.01); *H04W 4/06* (2013.01); *H04W 36/0083* (2013.01); *H04W 72/005* (2013.01); *H04W 76/002* (2013.01); *H04W 84/045* (2013.01)

(58) Field of Classification Search
CPC ..... H04W 24/10; H04W 4/06; H04W 72/005; H04W 84/045; H04W 48/20; H04W 48/18; H04W 36/0083; H04W 36/00; H04W 36/0016; H04W 36/0061; H04W 48/16; H04W 76/002; H04W 36/0088; H04W 36/24; H04W 48/00; H04W 36/08; H04W 36/30; H04W 48/12
USPC .......... 455/67.11, 414.3, 432.3, 452.1, 452.2, 455/436, 404.1, 437, 550.1, 418, 435.3, 455/434, 435.2, 443, 404.2, 411, 422.1, 455/435.1, 439, 442, 444, 445, 448, 449, 455/453, 456.1, 464, 512, 513, 525, 574; 370/230, 310, 328, 331, 312, 252, 329, 370/332
See application file for complete search history.

(56) References Cited

U.S. PATENT DOCUMENTS 7,751,403 B2   7/2010 Kim et al.
(Continued)

FOREIGN PATENT DOCUMENTS

JP   2006-148836 A   6/2006
(Continued)

OTHER PUBLICATIONS

3GPP, "Technical Specification 3rd Generation Partnership Project; Technical Specification Group Radio Access Network; Evolved Universal Terrestrial Radio Access (E-UTRA); User Equipment (UE) procedures in idle mode (Release 9)", 3GPP TS 36.304, V9.1.0, 2009, pp. 1-31.

(Continued)

*Primary Examiner* — Inder Mehra
(74) *Attorney, Agent, or Firm* — Birch, Stewart, Kolasch & Birch, LLP

(57) ABSTRACT

Efficient cell reselection taking the continuity of MBMS service into consideration is enabled. A communication system includes a base station apparatus managing a cell capable of providing a multimedia broadcast multicast service, and a mobile station apparatus belonging to a group of access-restricted cells, and the mobile station apparatus selects the access-restricted cell from the serving cell capable of providing the multimedia broadcast multicast service. The base station apparatus periodically transmits multimedia broadcast multicast service information to the mobile station apparatus (S101), and the mobile station apparatus is able to continue the multimedia broadcast multicast service being received from the cell capable of providing the multimedia broadcast multicast service by selecting the access-restricted cell and when a reception quality of the access-restricted cell satisfies cell reselection criteria, selects the access-restricted cell (S105).

6 Claims, 7 Drawing Sheets

(51) Int. Cl.
*H04W 36/00* (2009.01)
*H04W 72/00* (2009.01)
*H04W 76/00* (2009.01)
*H04W 84/04* (2009.01)

(56) References Cited

U.S. PATENT DOCUMENTS

| | | |
|---|---|---|
| 8,345,690 B2 | 1/2013 | Kim et al. |
| 2004/0185837 A1* | 9/2004 | Kim et al. ............ 455/414.3 |
| 2005/0141443 A1 | 6/2005 | Kim et al. |
| 2006/0109820 A1 | 5/2006 | Miyata |
| 2009/0190519 A1* | 7/2009 | Lee et al. ............ 370/312 |
| 2010/0113030 A1 | 5/2010 | Kanazawa et al. |
| 2010/0202307 A1* | 8/2010 | Lee et al. ............ 370/252 |
| 2010/0246497 A1 | 9/2010 | Kim et al. |
| 2012/0236776 A1* | 9/2012 | Zhang et al. ............ 370/312 |

FOREIGN PATENT DOCUMENTS

| | | |
|---|---|---|
| JP | 2007-166654 A | 6/2007 |
| JP | 2007-520114 A | 7/2007 |
| JP | 2007-536871 A | 12/2007 |
| JP | 4339380 B2 | 7/2009 |
| JP | 2009-206835 A | 9/2009 |
| WO | 2005/109687 A | 11/2005 |
| WO | WO 2005/109687 A1 | 11/2005 |
| WO | 2008/129812 A | 10/2008 |
| WO | WO 2008/129812 A1 | 10/2008 |

OTHER PUBLICATIONS

Nokia Corporation, Nokia Siemens Networks, "Alleviating effects of unicast mobility on MBMS", 3GPP TSG-RAN WG2 Meeting #68 R2-096562, 2009, pp. 1-2.

* cited by examiner

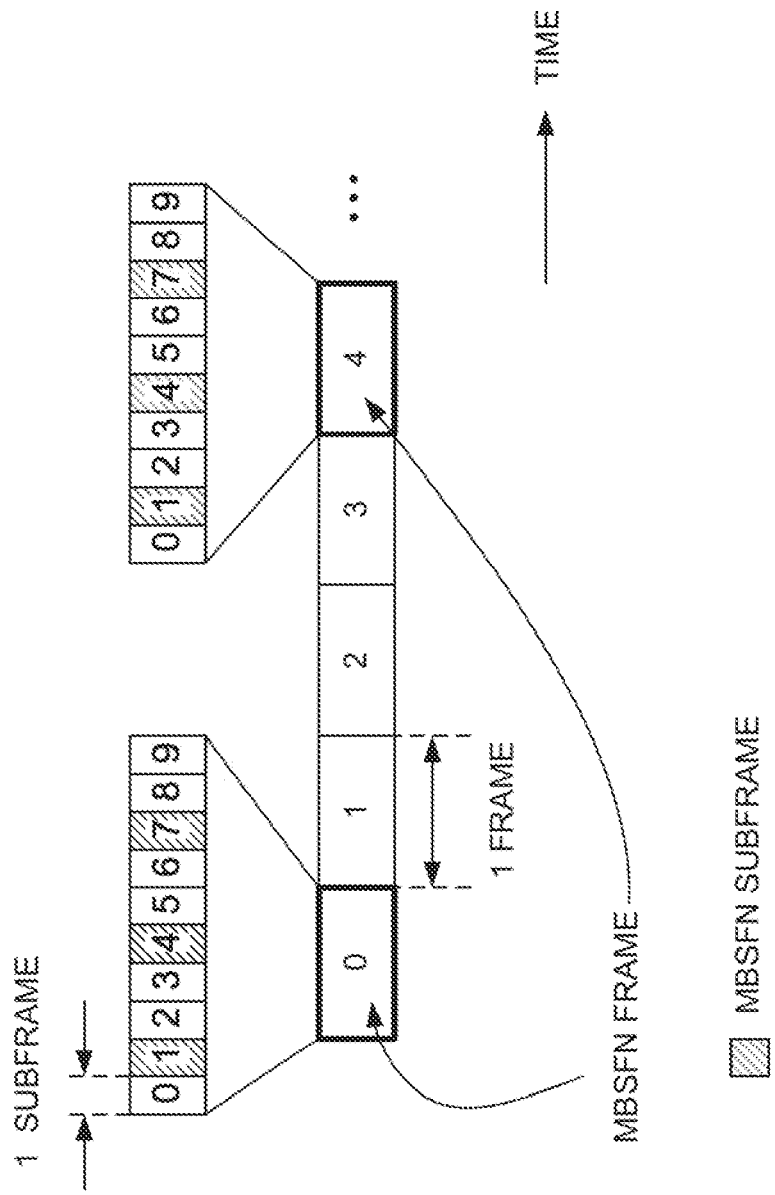

MOBILE STATION APPARATUS, COMMUNICATION SYSTEM, BASE STATION APPARATUS, CELL RESELECTION METHOD, CONTROL PROGRAM OF MOBILE STATION APPARATUS, AND INTEGRATED CIRCUIT

TECHNICAL FIELD

The present invention relates to a communication system, a mobile station apparatus, abase station apparatus, a cell reselection method, a control program of mobile station apparatus, and an integrated circuit, and in particular, relates to a cell reselection system when a mobile station apparatus performs MBMS reception.

BACKGROUND ART

In 3GPP (3rd Generation Partnership Project) as a standardization project, the Evolved Universal Terrestrial Radio Access (hereinafter referred to as the EUTRA) that can achieve high-speed communication by adopting an OFDM (Orthogonal Frequency-Division Multiplexing) communication system and flexible scheduling in units of predetermined frequency/time, which is called a resource block, has been discussed. Moreover, in the 3GPP, the Advanced EUTRA that achieves higher data transmission and has a backward compatibility with the EUTRA has also been discussed.

In the EUTRA and the Advanced EUTRA, the implementation of a multimedia broadcast multicast service (hereinafter referred to as the MBMS) has been considered. The MBMS is a multicast service of commonly informing the same multicast data (multimedia data) to a plurality of recipients. To reduce the interruption of the service, which is caused by frequency switching of a mobile station apparatus moving between cells during transmission of the MBMS, a scheme of MBSFN (MBMS over Single Frequency Network) of transmitting the MBMS using a carrier wave of a single frequency network (SFN) has been examined. The MBMS includes a method of transmitting the same multicast data from cells in cooperation according to the MBSFN (multimedia multicast communication single frequency network: Shared MBSFN) and a transmission method using Point-to-Point (hereinafter referred to as the PtP) or Point-to-Multipoint (hereinafter referred to as the PtM) connection according to the number of users located at each cell.

The multicast service provided by the MBMS is also referred to as an MBMS service or an MBMS session (hereinafter referred to as the MBMS service). Considering that the MBMS service in which the mobile station apparatus (user) is interested may be only a part of the whole MBMS services, a mechanism for receiving only the MBMS service in which the mobile station apparatus is interested is needed. Patent document 1 describes a mechanism in which a preferred frequency (Preferred Layer: PL) for selecting the MBMS service is informed from the base station apparatus, and the mobile station apparatus that is interested in the MBMS service adds an offset to a measurement result of the preferred frequency, thereby preferentially selecting the preferred frequency as a receiving frequency.

FIG. 6 is an illustration showing relationship between the MBMS service and frequency. As shown in this figure, a frequency F1 and a frequency F2 that are located in the spatially same area and operated as different frequencies are considered. The frequency F1 and the frequency F2 provide a first MBMS service and a second MBMS service, respectively, which are different from each other. At this time, when the base station apparatus designates the frequency F1 as the preferred frequency, the mobile station apparatus adds an offset value to a measurement value of the frequency F1, thereby obtaining a result of higher quality than an actual measurement result. As a result, the mobile station apparatus can preferentially select the frequency F1 as the receiving frequency.

Further, at present, in the 3GPP, home base station apparatuses located in households and offices are being examined. The 3rd-generation home base station apparatus prescribed by the 3GPP is referred to as a Home NodeB. The home base station apparatus in the EUTRA and the Advanced EUTRA is referred to as Home eNodeB. In addition, like the normal base station apparatus, the home base station apparatus manages, for each frequency, areas (cells) where the home base station apparatus can communicate with the mobile station apparatus, and the cells are referred to as home cells. The home cell is also referred to as a femtocell or a picocell according to the size of the area where the home base station apparatus can communicate with the mobile station apparatus. Moreover, a cell of the base station apparatus in communication is referred to as a serving cell, and a cell of the base station apparatus not in communication is referred to as a neighboring cell. Furthermore, a cell provided with access restriction in which specific users (mobile station apparatuses) are previously registered in a group, and thereby only the users belonging to the group can access the cell is referred to as a CSG (Closed Subscriber Group) cell. That is, the mobile station apparatus belonging to the group of the CSG cell regards the accessible CSG cell as a suitable cell and accesses the suitable cell, and the mobile station apparatus that does not belong to the group of the CSG cell regards the CSG cell as an acceptable cell, and is restricted from accessing the acceptable cell except for the case of high-priority communication such as emergency call.

To distinguish the CSG cell from the normal cell having no access restriction, at least the CSG-ID is transmitted by the broadcast information. The mobile station apparatus has therein a CSG cell list (also referred to as a CSG white list or an allowed CSG list) storing one or more CSG-IDs, and compares the CSG-ID in the broadcast information with the CSG-ID in the CSG cell list to confirm whether or not the CSG cell is accessible.

Non-patent document 1 describes a method in which the mobile station apparatus in a waiting state performs cell reselection for the CSG cell and the other cells. Non-patent document 2 describes a method of setting the priority of the CSG cell and the cell providing the MBMS service to the highest to perform cell reselection.

Prior Art Document

Patent Document

Patent document 1: Japanese Patent No. 4339380

Non-patent Document

Non-patent document 1: 3GPP, TS36.304, User Equipment (UE) procedures in idle mode, V9.1.0. 2010-01-05 http://www.3gpp.org/ftp/Specs/html-info/36304.htm Non-patent document 2: Nokia Corporation, Nokia Siemens Networks, R2-096562, 3GPP TSG-RAN2 Meeting #68, Jeju, Korea, 9-13 Nov., 2009

DISCLOSURE OF THE INVENTION

Problems to be Solved by the Invention

However, Patent document 1 and Non-patent document 1 do not consider the cell re-selection method based on whether or not the CSG cell provides the MBMS service. In addition, according to the method described in Non-patent document 2, the mobile station apparatus sets both the frequency (frequency layer) providing the MBMS service and the frequency of the CSG cell to the highest priority, and the mobile station apparatus may select either of them. However, according to such method, when the mobile station apparatus to which the MBMS service is applied moves to a CSG cell that does not provide the MBMS service through cell reselection, the user cannot receive the MBMS service in the CSG cell, which is undesirable in terms of the continuity of the service.

The present invention is made in view of the above problem, and has an object to provide a mobile station apparatus, a communication system, a base station apparatus, a cell reselection method, a control program of mobile station apparatus and an integrated circuit, which enable efficient cell reselection in consideration of the continuity of the MBMS service.

Means for Solving the Problems

To attain the above-mentioned object, the embodiment of the present invention takes following measures. That is, a communication system of the embodiment of the present invention includes a base station apparatus that manages a cell capable of providing a multimedia broadcast multicast service and a mobile station apparatus belonging to at least one group of access-restricted cells, the mobile station apparatus selecting the access-restricted cell from the cell capable of providing a multimedia broadcast multicast service, in which the base station apparatus periodically transmits information on a multimedia broadcast multicast service that can be provided, and when determining that the multimedia broadcast multicast service being received is continued even when the access-restricted cell belonging the group is selected, the mobile station apparatus selects the access-restricted cell on the basis of only the reception quality irrespective of the priority of the frequency arranged.

(1) To attain the above-mentioned object, the embodiment of the present invention takes following measures. That is, a mobile station apparatus of the embodiment of the present invention is a mobile station apparatus selecting an access-restricted second cell from a first cell capable of providing a multimedia broadcast multicast service, wherein the mobile station apparatus is able to continue a multimedia broadcast multicast service being received from the first cell in service by selecting the second cell confirmed to be accessible, and when a reception quality of the second cell satisfies cell reselection criteria, selects the second cell.

(2) Furthermore, the mobile station apparatus of the embodiment of the present invention determines whether or not it is possible to continue the multimedia broadcast multicast service being received from the first cell by selecting the second cell autonomously detected, based on multimedia broadcast multicast service information received from the second cell autonomously detected.

(3) Moreover, the mobile station apparatus of the embodiment of the present invention includes a list showing multimedia broadcast multicast service providing capability of the second cell, wherein the mobile station apparatus determines whether or not it is possible to continue the multimedia broadcast multicast service being received from the first cell by selecting the second cell autonomously detected, based on the list.

(4) Furthermore, the mobile station apparatus, after selecting the second cell, requests the selected second cell to start the multimedia broadcast multicast service being received from the first cell.

(5) In addition, a communication system of the embodiment of the present invention includes a base station apparatus managing a first cell capable of providing a multimedia broadcast multicast service; and a mobile station apparatus belonging to a group of access-restricted second cells, the mobile station apparatus selecting the second cell from the first cell in service, wherein the base station apparatus transmits multimedia broadcast multicast service information to the mobile station apparatus, and the mobile station apparatus is able to continue a multimedia broadcast multicast service being received from the first cell by selecting the second cell confirmed to be accessible, and when a reception quality of the second cell satisfies cell reselection criteria, selects the second cell.

(6) Furthermore, in the communication system of the embodiment of the present invention, the mobile station apparatus determines whether or not it is possible to continue the multimedia broadcast multicast service being received from the first cell by selecting the second cell autonomously detected, based on multimedia broadcast multicast service information received from the second cell autonomously detected.

(7) Moreover, in the communication system of the embodiment of the present invention, the mobile station apparatus includes a list showing multimedia broadcast multicast service providing capability of the second cell, and determines whether or not it is possible to continue the multimedia broadcast multicast service being received from the first cell in service by selecting the second cell autonomously detected, based on the list.

(8) Furthermore, in the communication system of the embodiment of the present invention, the mobile station apparatus, after selecting the second cell, requests the selected second cell to start the multimedia broadcast multicast service being received from the first cell.

(9) In addition, the communication system of the embodiment of the present invention further includes a higher-level control station apparatus controlling the multimedia broadcast multicast service, wherein the mobile station apparatus, when start of the multimedia broadcast multicast service is requested from the mobile station apparatus, requests the control station apparatus to transmit the multimedia broadcast multicast service.

(10) Moreover, a base station apparatus of the embodiment of the present invention is a base station apparatus communicating with a mobile station apparatus selecting an access-restricted second cell from a first cell capable of providing a multimedia broadcast multicast service, wherein the base station apparatus transmits information for confirming whether or not the second cell is accessible and multimedia broadcast multicast service information to the mobile station apparatus, and thereby causes the mobile station apparatus to determine whether or not it is possible to continue the multimedia broadcast multicast service being received from the first cell serving the mobile station apparatus also after selecting the second cell confirmed to be accessible.

(11) Furthermore, a cell reselection method of the embodiment of the present invention is a cell reselection method of a communication system including a base station apparatus managing a first cell capable of providing a multimedia broadcast multicast service, and a mobile station apparatus belonging to a group of access-restricted second cells, the mobile station apparatus selecting the second cell from the first cell in service, the cell reselection method comprising the steps of: transmitting, in the base station apparatus, multimedia broadcast multicast service information to the mobile station apparatus; determining, in the mobile station apparatus, whether or not it is possible to continue the multimedia broadcast multicast service being received from the first cell, by selecting the second cell confirmed to be accessible; determining whether or not a reception quality of the second cell satisfies cell reselection criteria when, as a result of the determination, it is possible to continue the multimedia broadcast multicast service being received from the first cell by selecting the second cell; and selecting the second cell when, as a result of the determination, the reception quality of the second cell satisfies the cell reselection criteria.

(12) In addition, a control program of a mobile station apparatus of the embodiment of the present invention is a control program of a mobile station apparatus selecting a first cell capable of providing a multimedia broadcast multicast service or an access-restricted second cell, the control program converting a series of processing into commands so as to enable a computer to read and execute them, the series of processing including processing of: determining whether or not it is possible to continue the multimedia broadcast multicast service being received from the first cell in service by selecting the second cell confirmed to be accessible; determining whether or not a reception quality of the second cell satisfies cell reselection criteria when, as a result of the determination, it is possible to continue the multimedia broadcast multicast service being received from the first cell by selecting the second cell; and selecting the second cell when, as a result of the determination, the reception quality of the second cell satisfies the cell reselection criteria.

(13) Furthermore, an integrated circuit of the embodiment of the present invention is an integrated circuit, by being mounted in a mobile station apparatus, causing the mobile station apparatus to exhibit a series of plurality of functions including: selecting a first cell capable of providing a multimedia broadcast multicast service or an access-restricted second cell; determining whether or not it is possible to continue the multimedia broadcast multicast service being received from the first cell in service by selecting the second cell confirmed to be accessible; determining whether or not a reception quality of the second cell satisfies cell reselection criteria when, as a result of the determination, it is possible to continue the multimedia broadcast multicast service being received from the first cell by selecting the second cell; and selecting the second cell when, as a result of the determination, the reception quality of the second cell satisfies the cell reselection criteria.

Although this description discloses the embodiment of the present invention in terms of an improvement of the cell reselection method in the mobile station apparatus, the main concept is not limited to the cell reselection method, and may be applied to other situations. In addition, a communication method to which the embodiment of the present invention can be applied is not limited to EUTRA or the communication method backward compatible with EUTRA, such as Advanced EUTRA.

Effect of the Invention

According to the embodiments of the present invention, it is possible to provide an efficient communication system, a mobile station apparatus, a base station apparatus, a cell reselection method and an integrated circuit, taking into account the continuity of the MBMS service.

BRIEF DESCRIPTION OF THE DRAWINGS

FIG. 7 is an illustration showing an example in which multicast data and unicast data are time-division multiplied and transmitted.

BEST MODES FOR CARRYING OUT THE INVENTION

Figure 1:
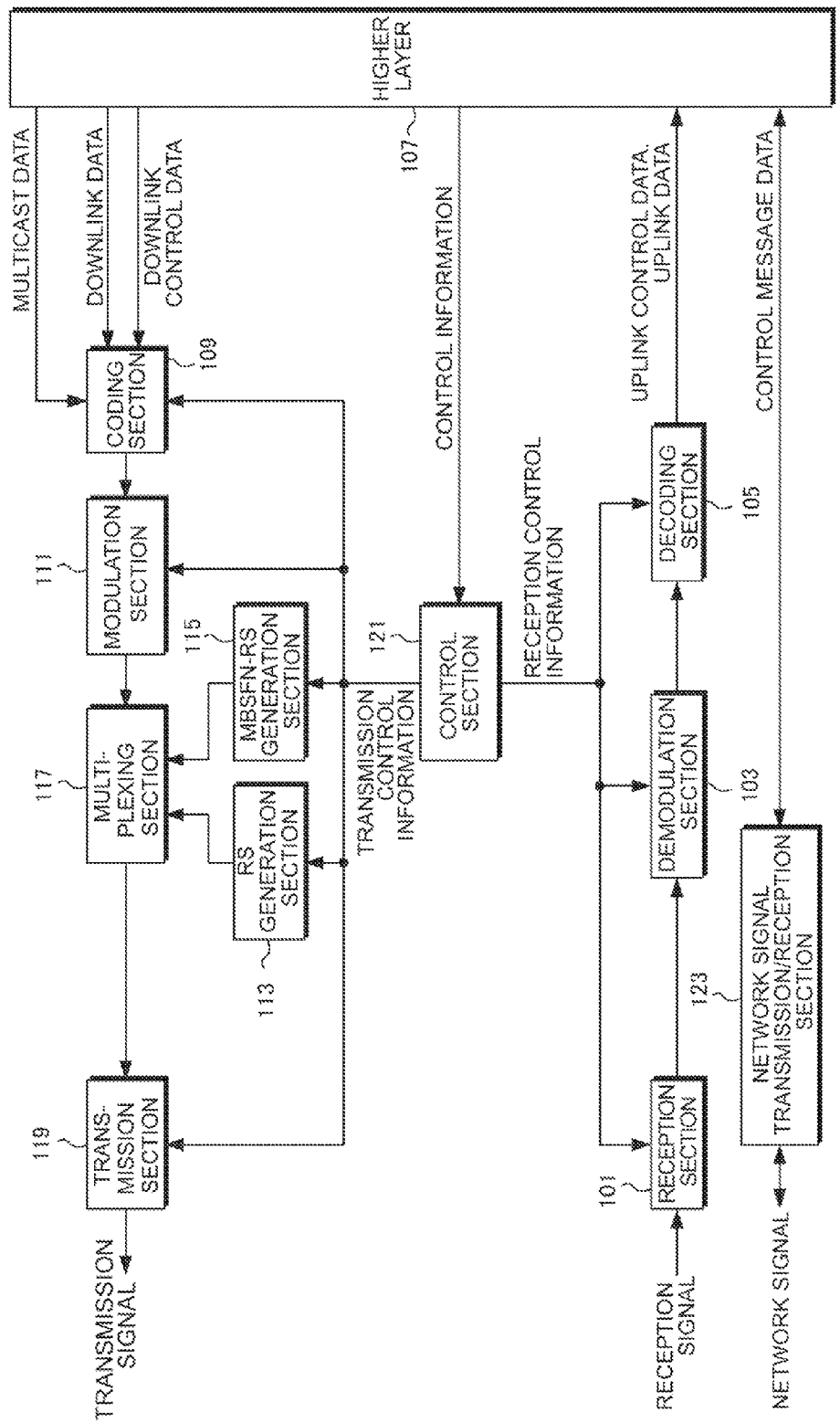
FIG. 1 is a block diagram showing an example of a base station apparatus of the embodiment of the present invention.

Before the description of embodiments of the present invention, physical channels and the MBMS that are related to the embodiment of the present invention will be briefly described below.

(1) Physical Channels

Main physical channels (or physical signals) used in the EUTRA and the Advanced EUTRA will be described. In future, the physical channels may be added or their structures may be changed in the EUTRA and the the Advanced EUTRA, but the change thereof does not affect description of each embodiment of the present invention. Synchronization signals include three types of primary synchronization signals and secondary synchronization signals formed of 31 types of codes alternately arranged in a frequency domain, and combinations of the primary synchronization signals and the secondary synchronization signals indicate 504 cell identifiers (Physical Cell Identity: PCI) for identifying the base station apparatus and a frame timing for radio synchronization. The mobile station apparatus identifies the cell ID of the synchronization signal received by cell search.

A physical broadcast Channel (PBCH) is transmitted to inform a control parameter (broadcast information (system information)) commonly used by the mobile station apparatuses in the cell. For the broadcast information that is not informed through the physical broadcast Channel, a radio resource is informed through the physical downlink control channel, and a layer 3 message (system information) is transmitted through a physical downlink shared channel. As the broadcast information, a cell global identifier (CGI) indicating an identifier unique to the cell or a tracking area identifier (TAI) managing a waiting area by paging is informed. If the cell is the CSG cell, the CSG-ID is informed by the broadcast information. If the cell can provide the MBMS service, the MBMS-ID is informed by the broadcast information.

A downlink reference signal is a pilot signal transmitted for each cell with predetermined power. In addition, the downlink reference signal is a known signal periodically transmitted at a frequency/time position according a predetermined rule. The mobile station apparatus receives the downlink reference signal to measure the reception quality of each cell. The mobile station apparatus also uses the downlink reference signal as a reference signal for demodulation of the physical downlink control channel or the physical downlink shared channel, which is transmitted with the downlink reference signal at the same time. The downlink reference signal independently transmitted to the mobile station apparatus for demodulation, among the downlink reference signals, is referred to as a mobile station apparatus specific reference signal (UE specific reference signal). A sequence that is distinguishable for each cell is used as a sequence used for the downlink reference signal. Note that, although the downlink reference signal may be also referred to as a cell-specific reference signal, its usage and meaning are the same.

A physical downlink control channel (PDCCH) is transmitted with some OFDM symbols from the beginning of each subframe, and is used to instruct radio resource allocation information or an adjustment amount of increase/decrease in transmit power according to scheduling of the base station apparatus to the mobile station apparatus. The mobile station apparatus needs to monitor the physical downlink control channel destined to the own station and receive the physical downlink control channel destined to the own station before transmitting/receiving the layer 3 message (paging, handover command, and so on) as downlink data and downlink control data, thereby acquiring radio resource allocation information, which is referred to as uplink grant at transmission and as downlink grant at reception, from the physical downlink control channel.

A physical uplink control channel (PUCCH) is used to make a reception confirmation response to the data transmitted through a physical downlink shared channel, provide downlink channel state information (CQI: Channel Quality Indicator), and make a scheduling request (SR) as an uplink radio resource request.

A physical downlink shared channel (PDSCH) is used to inform the downlink data as well as paging and broadcast information as the layer 3 message that is the downlink control data. The radio resource allocation information of the physical downlink shared channel is informed through the physical downlink control channel. The physical downlink shared channel is also used to transmit below-mentioned multicast data (MBMS data). A physical multicast channel (PMCH) transmits multicast data (MBMS data) for providing the MBMS service. The physical multicast channel is transmitted by an MBSFN subframe, and is time-multiplexed with the physical downlink control channel in the subframe.

An MBSFN reference signal (MBSFN-RS) is transmitted together with the physical multicast channel at the same time, and is used as a reference signal for demodulation of the physical multicast channel. A physical uplink shared channel (PUSCH) transmits mainly uplink data and uplink control data, and can include control data such as downlink reception quality and ACK/NACK. As in downlink, the radio resource allocation information of the physical uplink shared channel is indicated by the physical downlink control channel.

A physical random access channel (PRACH) is a channel used to inform a preamble sequence and has a guard time. The physical random access channel is used as an access means of the mobile station apparatus to the base station apparatus. The mobile station apparatus uses the physical random access channel to request the base station apparatus to transmit a radio resource request when the physical uplink control channel is not yet set and transmission timing adjustment information (also referred to as timing advance (TA)) necessary for matching an uplink transmission timing with a reception timing window of the base station apparatus. When receiving the transmission timing adjustment information, the mobile station apparatus sets an effective time (TA timer) of the transmission timing adjustment information, and manages the state as a transmission timing adjusted state during the effective time, and as a transmission timing unadjusted state during the time other than the effective time. The base station apparatus can also allocate a dedicated preamble to the mobile station apparatus to start random access. Note that, the other physical channels are not related to the embodiments of the present invention and thus, detailed description thereof is omitted.

(2) MBMS

The MBMS service can be received by both of the mobile station apparatus in a waiting state (RRC_IDLE mode) and the mobile station apparatus in a communicating state (RRC_CONNECTED mode). The cells providing the MBMS service include cells (MBMS Dedicated Cell) that specialize in performing multicast transmission (transmission of multicast data) using a frequency other than a frequency used for unicast transmission (transmission of unicast data (downlink data) from a single cell to individual mobile station apparatuses), and mixed cells (MBMS/Unicast-mixed Cell) that perform both the multicast transmission and the unicast transmission using the frequency used for the unicast transmission, and by transmitting the multicast data using any of the cells, provide the MBMS service to the plurality of mobile station apparatuses (users) at the same time. For the mixed cells, the multicast transmission and the unicast transmission are time-division multiplexed.

FIG. 7 is an illustration showing an example in which the multicast data and the unicast data are time-division multiplexed and transmitted. FIG. 7 shows an example of arrangement of the multicast transmission and the unicast transmission in the mixed cell. The frame including the MBMS service and which subframe in the frame is used for the MBMS service are commonly defined in each MBSFN area. The arrangement information is referred to as a common subframe allocation pattern. The pattern is previously informed from the base station apparatus to the mobile station apparatus by using the broadcast information or the like, and the mobile station apparatus can recognize which subframe transmits the multicast data. A subframe that may provide the MBMS service is referred to as an MBSFN subframe, and a frame including the MBSFN subframe is referred to as an MBSFN frame. A subframe in which the unicast data is arranged is referred to as a unicast subframe.

It should be noted that even the MBSFN subframe can transmit (or does not transit) any data other than the multicast data. In the OFDM symbol in which the multicast data is transmitted, the mobile station apparatus does not receive the downlink reference signal. On the other hand, in the PtP (Point-to-Point) or PtM (Point-to-Multipoint) connection, the multicast data is transmitted by using the radio resource used for transmission of normal unicast data.

A content of the multicast data provided by the MBMS service is identified according to MBMS-ID as an identifier for identifying the MBMS service (for example, TMGI (Temporary Mobile Group Identity), MBMS session ID, and MBMS service ID). The MBMS-ID is informed to the mobile station apparatus in the cell by using the broadcast information. Alternatively, the base station apparatus individually informs the MBMS-ID to the connected mobile station apparatus. The MBMS-ID is informed through a multicast control channel (MCCH) as a logic channel arranged in the MBSFN subframe, or through a dedicated control channel (DCCH). A multicast channel subframe allocation (MSA) indicating transmission of the multicast data is informed through the MCCH. By using the MBMS-ID, the base station apparatus can indicate the start of the MBMS service, MCH scheduling information, and the end of the MBMS service (MSA end) to the mobile station apparatus.

In consideration of the above-mentioned matters, preferred embodiments of the present invention will be briefly described with reference to appended figures. Note that, in describing the embodiment of the present invention, when it is deemed that the specific description on publicly known functions and configurations related to the embodiment of the present invention makes the subject matter of the embodiment of the present invention unclear, the detailed description is omitted.

<First Embodiment>

A first embodiment of the present invention will be described below. In this embodiment, a cell reselection method in which a mobile station apparatus reselects the cell in consideration of whether or not to provide the MBMS service is described.

FIG. 1 is a block diagram showing an example of a base station apparatus of the embodiment of the present invention. This base station apparatus includes a reception section 101, a demodulation section 103, a decoding section 105, a higher layer 107, a coding section 109, a modulation section 111, an RS generation section 113, an MBSFN-RS generation section 115, a multiplexing section 117, a transmission section 119, a control section 121, and a network signal transmission/reception section 123.

The higher layer 107 inputs the downlink data and the downlink control data to the coding section 109. The coding section 109 encodes the input data, and inputs the encoded data to the modulation section 111. The modulation section 111 modulates the encoded signal. Furthermore, the signal output from the coding section 109 and the downlink reference signal generated by the RS generation section 113 are mapped to a frequency domain in the multiplexing section 117. In addition, similarly, the multicast data is input to the coding section 109, and encoded data is output to the modulation section 111. The multicast data modulated by the modulation section 111 and the MBSFN reference signal generated by the MBSFN-RS generation section 115 are mapped to the frequency domain in the multiplexing section 117. A signal output from the multiplexing section 117 is input to the transmission section 119. The transmission section 119 converts the frequency domain signal into a time domain signal, and transmits the time domain signal on a carrier wave of predetermined frequency for power amplification.

Moreover, the reception section 101 converts a signal received from the mobile station apparatus into a baseband digital signal. The digital signal is input to the demodulation section 103 to be demodulated. Subsequently, the signal demodulated by the demodulation section 103 is input to the decoding section 105 to be decoded. The correctly decoded uplink control data and uplink data are output to the higher layer 107. The control information necessary for the control of each block is input from the higher layer 107 to the control section 121, the control information related to transmission as transmission control information is input from the control section 121 to each block of the coding section 109, the modulation section 111, the RS generation section 113, the multiplexing section 117, and the transmission section 119, and the control information related to reception as reception control information is input from the control section 121 to each block of the reception section 101, the demodulation section 103, and the decoding section 105. Note that, when the base station apparatus does not perform the multicast transmission using the MBSFN subframe, the MBSFN-RS generation section 115 may be omitted. The network signal transmission/reception section 123 transmits/receives a control message between the base station apparatuses, or between a control station apparatus (MME, or gateway apparatus (GW)) and the base station apparatus, and exchanges control message data with the higher layer 107. In FIG. 1, other constituents of the base station apparatus are not related to this embodiment and thus, are omitted.

Figure 2:
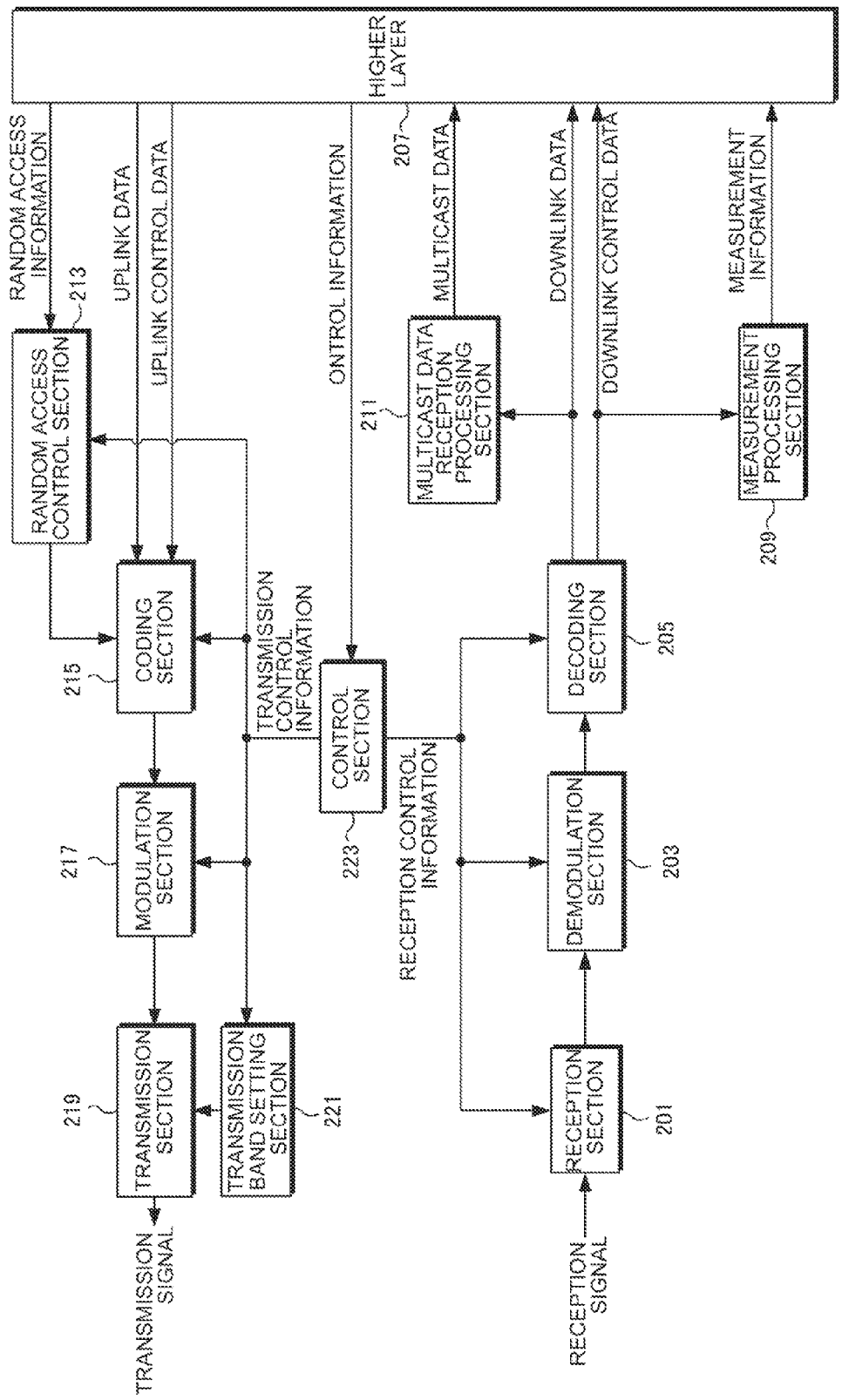
FIG. 2 is a block diagram showing an example of a mobile station apparatus of the embodiment of the present invention.

FIG. 2 is a block diagram showing an example of the mobile station apparatus of the embodiment of the present invention. The mobile station apparatus includes a reception section 201, a demodulation section 203, a decoding section 205, a higher layer 207, a measurement processing section 209, a multicast data reception processing section 211, a random access control section 213, a coding section 215, a modulation section 217, a transmission section 219, a transmission band setting section 221, and a control section 223. Prior to reception, the control information is input from the higher layer 207 to the control section 223, and the control information related to reception as the reception control information is properly input to the reception section 201, the demodulation section 203, and the decoding section 205. The reception control information includes information on the receiving frequency band as well as MBMS information (MBMS-ID, MBSFN subframe information, MBMS service information and so on), and information on reception timing, multiplexing method, and resource arrangement of each channel. The higher layer 207 includes RRC (Radio Resource Control) that controls the radio resource and NAS (Non Access Stratum) that controls a protocol of non access stratum (protocol that does not depend on an access method). In addition, the random access control section 213 functions as a part of MAC (Medium Access Control) that manages a data link layer.

A reception signal is received by the reception section 201. The reception section 201 receives the signal in a frequency band designated in the reception control information. The received signal is input to the demodulation section 203. The demodulation section 203 demodulates the reception signal and inputs the demodulated signal to the decoding section 205, and the decoding section 205 correctly decodes the downlink data and the downlink control data, and inputs the decoded data to the higher layer 207. The decoding section 205 also identifies the unicast subframe and the MBSFN subframe on the basis of the MBMS information, and receives the multicast data according to the identification. The multicast data reception processing section 211 receives an input of the multicast data, acquires the multicast data providing the received MBMS service, and transmits the multicast data to the higher layer 207. The downlink control data is also input to the measurement processing section 209. The measurement processing section 209 generates measurement information on the basis of the reception quality measurement of the downlink reference signal in each cell or the MBSFN reference signal (MBSFN-RS) transmitted in the MBSFN subframe, and a measurement result of a reception error rate of the physical downlink control channel or the downlink data channel, and outputs the measurement information to the higher layer 207.

Furthermore, prior to transmission, the control information is input from the higher layer 207 to the control section 223, and control information related to transmission as the transmission control information is properly input to the random access control section 213, the coding section 215, the modulation section 217, and the transmission band setting section 221. The transmission control information includes code information, modulation information, transmission frequency band information, and transmission timing, the multiplexing method and resource arrangement information related to each channel, as uplink scheduling information of a transmission signal. Random access information is input to the random access control section 213 to generate random access data. The random access information includes preamble information and transmission resource information. In addition to the random access data, the uplink data and the uplink control data are input from the higher layer 207 to the coding section 215. According to the transmission control information, the coding section 215 properly encodes each data and outputs the encoded data to the modulation section 217. The modulation section 217 modulates the output from the coding section 215. The transmission band setting section 221 sets the transmission frequency band to the transmission section 219. The transmission section 219 maps the output of the modulation section 217 to the frequency domain, converts a frequency domain into a time domain signal, and transmits the time domain signal on a carrier wave of predetermined frequency for power amplification.

Moreover, the mobile station apparatus has a function of detecting the position of the CSG cell to verify whether or not it is an accessible CSG cell (second cell). That is, when the CSG-ID informed by the broadcast information is stored in a CSG cell list, the mobile station apparatus determines that the CSG cell is accessible. Although the function of detecting the position of the CSG cell and the function of verifying the accessible CSG cell are preferably performed by the higher layer 207 of the mobile station apparatus, these functions may be performed by any functional block. In FIG. 2, other constituents of the mobile station apparatus are not related to this embodiment and thus, are omitted.

Figure 3:
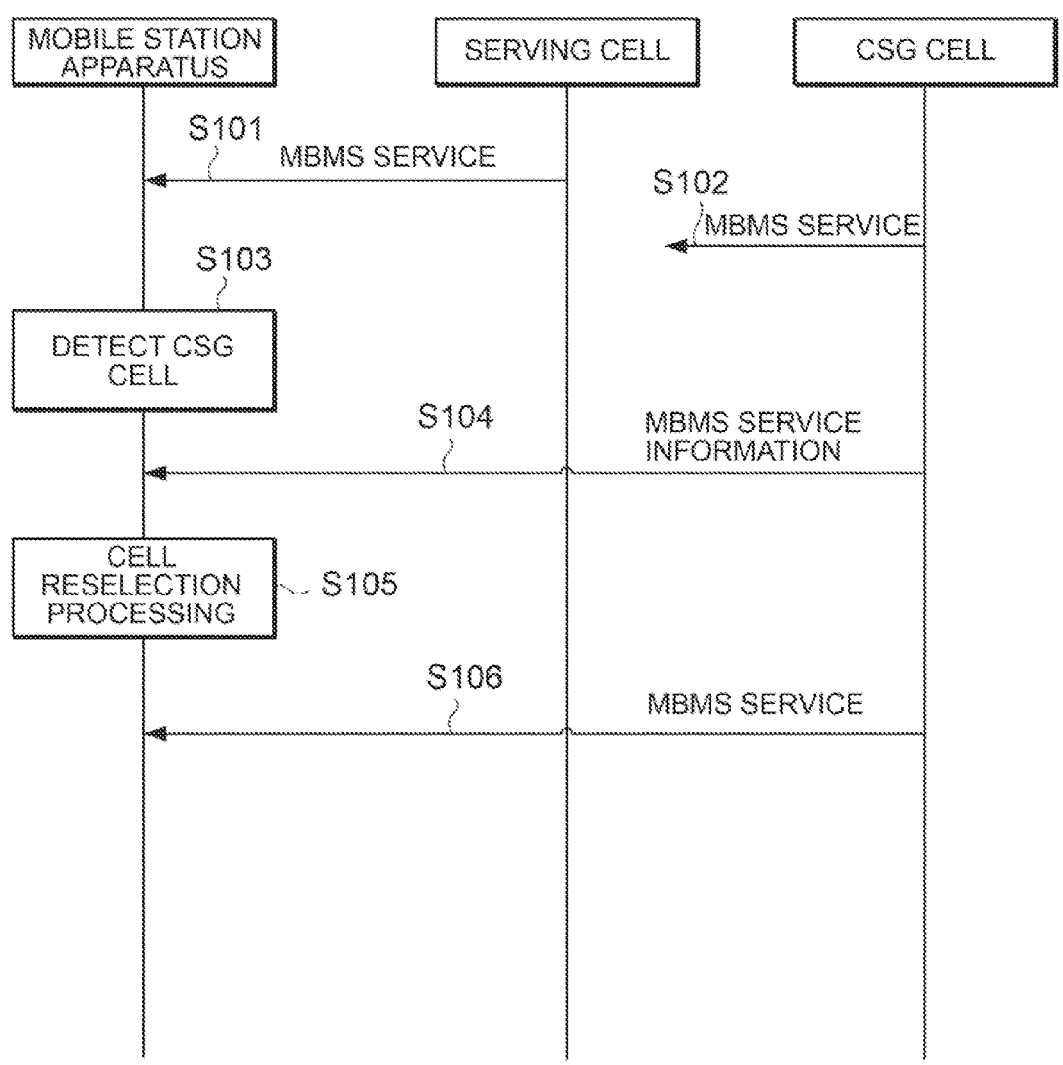
FIG. 3 is a sequence chart showing a cell reselection method based on whether or not to continue an MBMS service in cell reselection of the mobile station apparatus in accordance with a first embodiment of the present invention.

FIG. 3 is a sequence chart showing a cell reselection method based on whether or not to continue the MBMS service in cell reselection of the mobile station apparatus in accordance with the first embodiment of the present invention. In FIG. 3, the case is considered where the mobile station apparatus receives a certain kind of MBMS service in the serving cell (typically, macro cell, first cell) (Step S101). The mobile station apparatus is in the waiting state (RRC_IDLE mode). Here, since the mobile station apparatus is away from the CSG cell, the MBMS service is not yet provided from the CSG cell (Step S102). Furthermore, the mobile station apparatus holds one or more CSG-IDs in the CSG cell list. When coming close to the accessible CSG cell by autonomous detection of the CSG cell (Step 5103) enables reception of the transmission signal from the CSG cell, the mobile station apparatus acquires the MBMS service information from the base station apparatus as the CSG cell (Step S104).

The autonomous detection method used by the mobile station apparatus may be any method. According to an autonomous detection method, the mobile station apparatus can detect the position of the accessible CSG cell through matching with cell IDs of a plurality of neighboring cells. The mobile station apparatus further includes a GPS/GNSS (Global Positioning System/Global Navigation Satellite System) function part, and the higher layer 207 or other suitable blocks can refer to an output of the GPS/GNSS function part, thereby detecting the position of the CSG cell that the own station can access. The MBMS service information is transmitted from the base station apparatus of the CSG cell through the MCCH or the DCCH. Preferably, the MBMS service information is periodically transmitted as the broadcast information. The mobile station apparatus can receive the MBMS service information to recognize contents of the MBMS service provided by the CSG cell. The mobile station apparatus receives the MBMS service information at any timing autonomously set by the mobile station apparatus. If the MBMS service in the serving cell can be continued, the mobile station apparatus performs cell reselection processing on the basis of the reception quality of the CSG cell according to a cell reselection procedure taking into account the CSG cell (Step S105), reselects the CSG cell and receives the MBMS service from the CSG cell (Step S106). Note that, when the MBMS service cannot be continued, even if detecting the accessible CSG cell, the mobile station apparatus performs a conventional cell reselection procedure that does not take into account the CSG cell.

More specifically, if a CSG cell can continue the MBMS service received in the serving cell, for the CSG cell, the mobile station apparatus regards a priority value of the frequency arranged as the highest priority, and when the reception quality (RSRP, RSRQ, path loss, etc.) of the CSG cell exceeds the reception quality of the serving cell for certain time or longer, performs cell reselection. At this time, the mobile station apparatus takes into account various offset values designated for each frequency or each cell. Furthermore, if the CSG cell cannot continue the MBMS service of the serving cell, the mobile station apparatus performs cell reselection on the basis of conventional cell reselection criteria using the priority of the frequency designated in the broadcast information without changing the priority of the frequency of the CSG cell from the conventional priority. Note that, when the mobile station apparatus does not receive the MBMS service, the cell reselection criteria return to the cell reselection criteria taking the accessible CSG cell into account.

Figure 4:
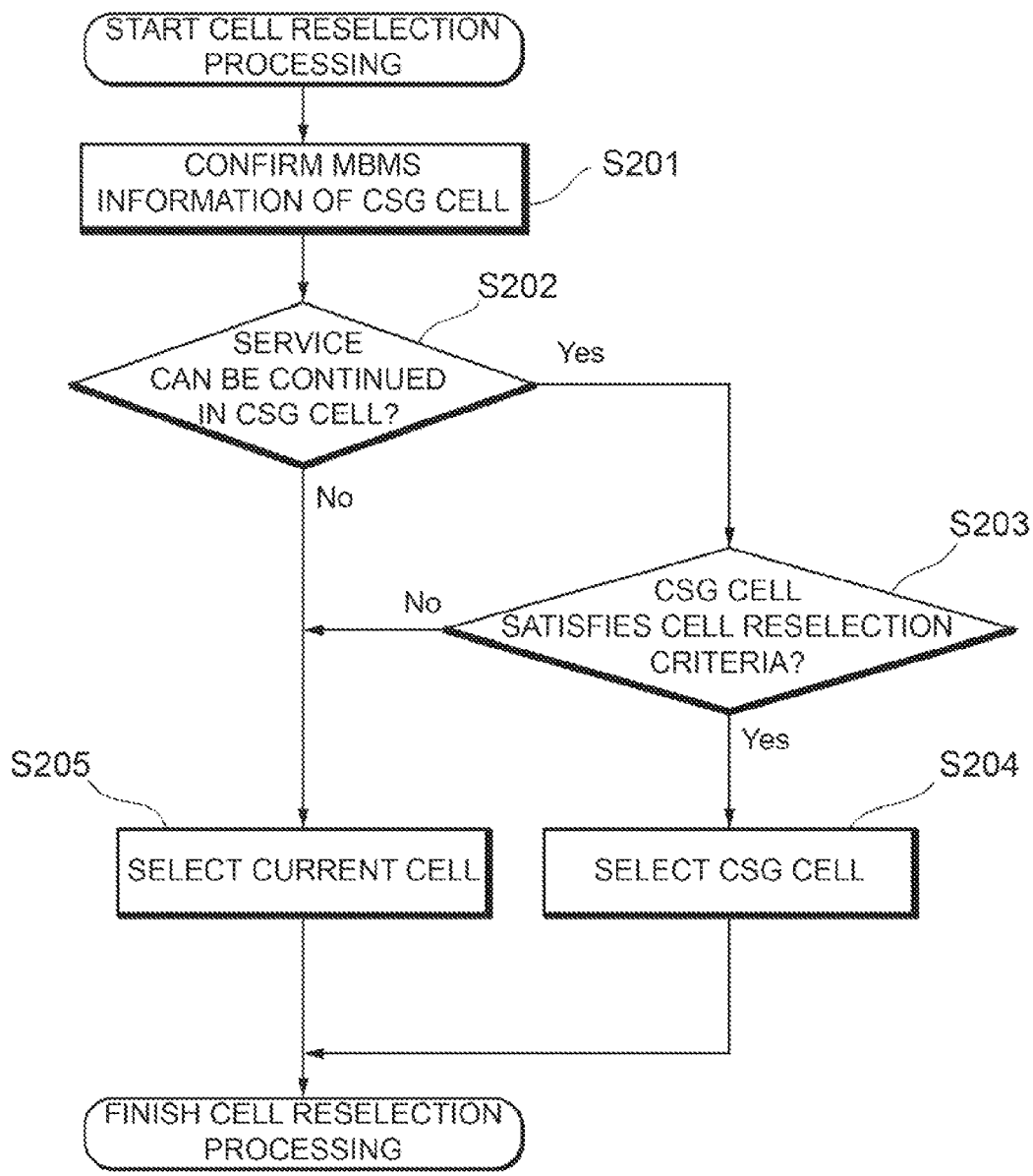
FIG. 4 is a flow chart showing cell reselection processing of the mobile station apparatus in accordance with the first embodiment of the present invention.

FIG. 4 is a flow chart showing the cell reselection processing of the mobile station apparatus in accordance with the first embodiment of the present invention. First, when autonomously detecting the accessible CSG cell, the mobile station apparatus acquires the MBMS service information from the CSG cell (Step S201). Then, the mobile station apparatus determines whether or not the MBMS service being received in the serving cell can be continued even when the mobile station apparatus reselects the CSG cell (Step S202). When determining that the same MBMS service can be continued in the CSG cell (Step S202: YES), the mobile station apparatus sets the priority value of the frequency for which the CSG cell is arranged to a highest value, and starts the cell reselection procedure. Then, when the reception quality of the CSG cell satisfies the cell reselection criteria (Step S203: YES), the mobile station apparatus selects the CSG cell and completes the cell reselection processing (Step S204).

On the contrary, when the mobile station apparatus determines that the same MBMS service can be continued in the CSG cell (Step S202: NO), or the reception quality of the CSG cell does not satisfy the cell reselection criteria (Step S203: NO), the mobile station apparatus selects the current serving cell, and completes the cell reselection processing (Step S205). Even if the MBMS service cannot be continued in the CSG cell, when the CSG cell is selected according to the conventional cell reselection criteria that do not take the CGS cell into account, the mobile station apparatus selects the CSG cell.

Note that, information indicating whether or not the cell reselection control described in this embodiment may be designated by the broadcast information. That is, as shown in FIG. 4, information indicating whether or not the mobile station apparatus can change the cell reselection method on the basis of the continuity of the MBMS service maybe designated by the broadcast information of the serving cell or the CSG cell.

As described above, when determining that the MBMS service being received is not continued after cell reselection, even if the CSG cell is the accessible CSG cell, the mobile station apparatus does not apply the cell reselection method taking the CSG cell into account, such as changing the priority of the frequency. On the other hand, when the mobile station apparatus is not interested in the MBMS service, or determines that the MBMS service being received is continued after cell reselection, the mobile station apparatus applies the cell reselection method taking the CSG cell into account, such as changing the priority of the frequency, to the accessible CSG cell. As described above, since it becomes easy for the mobile station apparatus that is interested in the MBMS service to select a cell providing the interested MBMS service, the continuity of the MBMS service is improved, enabling efficient MBMS reception. Moreover, the base station apparatus can inform the mobile station apparatus of information necessary for the mobile station apparatus to continue the MBMS service to improve the continuity of the MBMS service.

<Second Embodiment>

A second embodiment of the present invention will be described below. In the first embodiment, the continuity of the MBMS service is confirmed from the broadcast information of the CSG cell, and the cell reselection processing is performed based on the confirmation result, but, in the accessible CSG cell, in some cases, the mobile station apparatus previously recognize a MBMS transmission capability of the CSG cell. For this reason, in the second embodiment, it is determined whether or not the MBMS service can be continued in the accessible CSG cell on the basis of internal information (for example, a list showing MBMS service providing capability) held by the mobile station apparatus rather than the broadcast information from the CSG cell. The list maybe the CSG cell list. That is, the mobile station apparatus in the second embodiment skips MBMS service information confirmation processing (Step S201) of the CSG cell in FIG. 4, and performs determination based on the internally stored information. When the mobile station apparatus does not hold the MBMS service information of the accessible CSG cell, or a predetermined time has lapsed and thus, the reliability of the held information is doubtful, the method in the first embodiment may be adopted.

As described above, in addition to the first embodiment, the mobile station apparatus can determine whether or not to apply the cell reselection method taking the CSG cell into account without receiving the MBMS service information. Thus, since it becomes easy for the mobile station apparatus that is interested in the MBMS service to select a cell providing the interested MBMS service, the continuity of the MBMS service is improved, enabling efficient MBMS reception. Further, in addition to the first embodiment, the mobile station apparatus does not need to acquire the broadcast information from the CSG cell, which simplifies the processing.

<Third Embodiment>

A third embodiment of the present invention will be described below. In the third embodiment, a cell reselection method of the mobile station apparatus and a method of continuing the MBMS service after cell reselection when the accessible CSG cell can provide the MBMS service, but does not start the MBMS service are described.

Figure 5:
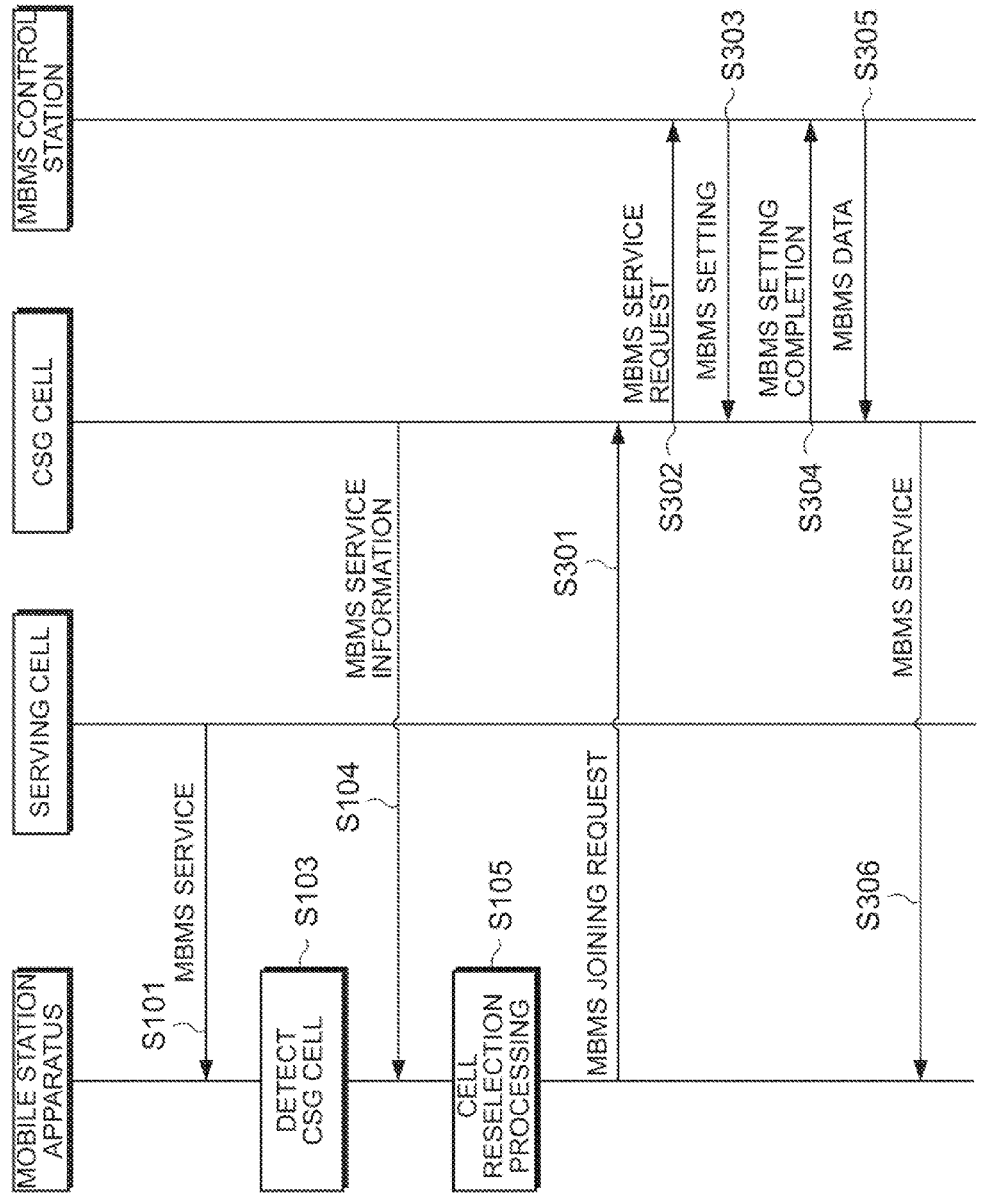
FIG. 5 is a sequence chart showing a cell reselection method based on whether or not to continue an MBMS service in cell reselection of the mobile station apparatus in accordance with a second embodiment of the present invention.
Figure 6:
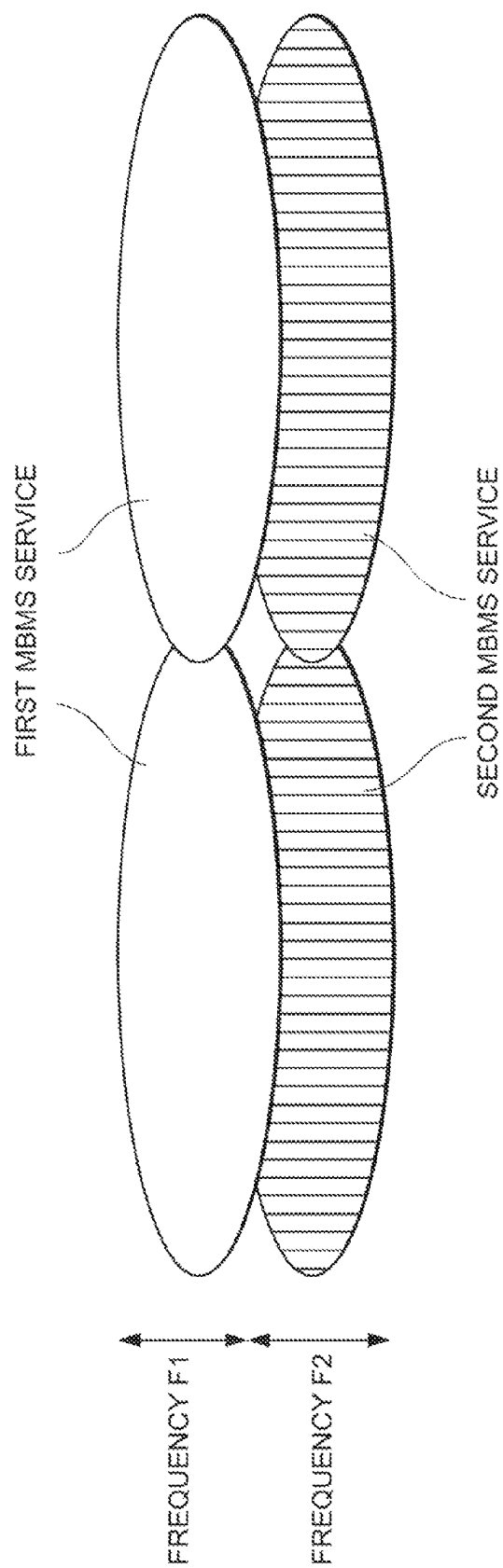
FIG. 6 is an illustration showing relationship between the MBMS service and frequency.

FIG. 5 is a sequence chart showing a cell reselection method based on whether or not to continue an MBMS service in cell reselection of the mobile station apparatus in accordance with the second embodiment of the present invention. FIG. 5 is different from FIG. 3 in that the CSG cell does not start the MBMS data transmission. The flow of receiving the MBMS service information to recognize the content of the MBMS service that can be provided from the CSG cell, and performing the cell reselection processing on the basis of the MBMS service information in FIG. 5 (Steps S101 to 105) is the same as the flow in FIG. 3 and thus, the description thereof is omitted. When the accessible CSG cell is selected by the cell reselection processing, and the CSG cell does not provide the MBMS service, the mobile station apparatus transmits an MBMS joining request to the base station apparatus of the CSG cell (Step S301). Preferably, the MBMS joining request is transmitted by an RRC message or an NAS message through the physical uplink shared channel after a random access procedure. The MBMS joining request may contain an identifier (MBMS session ID, MBMS service ID) of the desired MBMS service (that is, the MBMS service that the mobile station apparatus currently receives).

Subsequently, the base station apparatus of the CSG cell, which has received the MBMS joining request from the mobile station apparatus, requests the MBMS service to an MBMS control station as a high-level control station apparatus (Step S302). The MBMS control station includes a multi-cell/multicast coordination entity (MCE) that permits the MBMS service to the base station apparatus and allocates a resource and an E-MBMS gateway that transmits actual MBMS data packets to the base station apparatus. These are logically arranged over a network, and are connected to the base station apparatus via a logical interface. A higher-level control station apparatus (MME) of the MBMS control station may exist.

Referring back to FIG. 5, the base station apparatus of the CSG cell generates an MBMS service request message representing a request to transmit the MBMS data packets identified based on the identifier of the MBMS service, and transmits the MBMS service request message to the MBMS control station (Step S302). The MBMS control station that has received the MBMS service request message transmits an MBMS configuration message to the base station apparatus of the CSG cell (Step S303). Information necessary for making it possible to continuously provide the MBMS service to the mobile station apparatus (MBMS-ID, MSA, modulation scheme information, and so on) is set in the MBMS configuration message. The base station apparatus of the CSG cell, which has received the MBMS configuration message, updates its own configuration on the received information, and after updating, transmits an MBMS configuration complete message indicating normal completion of the updating to the MBMS control station (Step S304).

Subsequently, the MBMS data is transmitted from the MBMS control station to the base station apparatus of the CSG cell (Step S305), and the base station apparatus of the CSG cell starts to provide the MBMS service to the mobile station apparatus (Step S306). According to scheduling and the capability of the base station apparatus, the base station apparatus determines whether to receive the interested MBMS data while keeping communication with the mobile station apparatus, or to transit to the waiting state and then, receive the MBMS data. In case where the mobile station apparatus receives the MBMS data in the waiting state, after the random access procedure, the base station apparatus instructs radio resource connection release (RRC connection release) as the RRC message.

The procedure performed between the base station apparatus of the CSG cell and the MBMS control station may be performed as a configuration setup procedure of a logical interface of the base station apparatus or MBMS control station. Similarly, the procedure performed between the base station apparatus of the CSG cell and the MBMS control station maybe performed as a configuration update procedure of the base station apparatus or MBMS control station. Furthermore, the MBMS configuration message may be realized using an MBMS service start request such as an MBMS session start message. The mobile station apparatus may transmit the MBMS joining request to the MBMS control station via the base station apparatus of the CSG cell or directly to the MME.

As described above, in addition to the first and second embodiments, in order to continue the MBMS service, after cell reselection, the mobile station apparatus transmits the MBMS joining request to the base station apparatus of the CSG cell. Then, the base station apparatus of the CSG cell informs the MBMS control station of the MBMS service requested by the mobile station apparatus to request transmission of related MBMS data. On the basis of the request from the base station apparatus of the CSG cell, the MBMS control station starts to transmit corresponding MBMS data. As described above, since it becomes easy for the mobile station apparatus that is interested in the MBMS service to select a cell providing the interested MBMS service, the continuity of the MBMS service is improved, thereby enabling efficient MBMS reception. Further, since the mobile station apparatus requests the MBMS being received as needed, when transmission is not required, the base station apparatus does not need to provide the MBMS service, which increases the flexibility of scheduling.

(a) To attain the above-mentioned object, the embodiment of the present invention takes following measures. That is, a mobile station apparatus of the embodiment of the present invention is a mobile station apparatus selecting an access-restricted second cell from a first cell capable of providing a multimedia broadcast multicast service, is able to continue the multimedia broadcast multicast service being received from the serving first cell in service by selecting the second cell confirmed to be accessible, and when the reception quality of the second cell satisfies cell reselection criteria, selects the second cell.

As described above, since the mobile station apparatus is able to continue the multimedia broadcast multicast service being received from the serving first cell in service by selecting the second cell confirmed to be accessible, and when the reception quality of the second cell satisfies cell reselection criteria, selects the second cell, it becomes easy for the mobile station apparatus that is interested in the MBMS service to select a cell providing the interested MBMS service. As a result, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(b) Moreover, the mobile station apparatus of the embodiment of the present invention determines whether or not it is possible to continue the multimedia broadcast multicast service being received from the first cell, by selecting the second cell autonomously detected on the basis of multimedia broadcast multicast service information received from the second cell autonomously detected.

As described above, since the mobile station apparatus selects the autonomously detected second cell on the basis of multimedia broadcast multicast service information received from the autonomously detected second cell to determine whether or not the multimedia broadcast multicast service being received from the first cell can be continued, it becomes easy for the mobile station apparatus that is interested in the MBMS service to select a cell providing the interested MBMS service. As a result, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(c) In addition, the mobile station apparatus of the embodiment of the present invention further includes a list showing multimedia broadcast multicast service providing capability of the second cell, and determines whether or not the multimedia broadcast multicast service being received from the first cell can be continued, by selecting the autonomously detected second cell on the basis of the list.

As described above, since the mobile station apparatus includes a list showing the multimedia broadcast multicast service providing capability of the second cell, and determine whether or not the multimedia broadcast multicast service being received from the first cell can be continued, by selecting the autonomously detected second cell on the basis of the list, it becomes easy for the mobile station apparatus that is interested in the MBMS service to select a cell providing the interested MBMS service. As a result, the continuity of the MBMS service is improved, thereby enabling efficient MBMS reception. Moreover, the mobile station apparatus does not need to acquire the broadcast information from the CSG cell, which simplifies the processing.

(d) Moreover, in the mobile station apparatus of the embodiment of the present invention, after selection of the second cell, start of the multimedia broadcast multicast service being received from the first cell is requested to the selected second cell.

As described above, since after selection of the second cell, the mobile station apparatus requests the selected second cell to start the multimedia broadcast multicast service being received from the first cell, it becomes easy for the mobile station apparatus that is interested in the MBMS service to select a cell providing the interested MBMS service. As a result, the continuity of the MBMS service is improved, thereby enabling efficient MBMS reception. Further, since the mobile station apparatus requests the MBMS being received as needed, when transmission is not required, the base station apparatus does not need to provide the MBMS service, which increases the flexibility of scheduling.

(e) Furthermore, a communication system of the embodiment of the present invention includes a base station managing a first cell capable of providing a multimedia broadcast multicast service, and a mobile station apparatus belonging to a group of access-restricted second cells, the mobile station apparatus selecting the second cell from the serving first cell, in which the base station apparatus periodically transmits the multimedia broadcast multicast service information to the mobile station apparatus, and when the multimedia broadcast multicast service being received from the first cell can be continued, by selecting the second cell confirmed to be accessible, and the reception quality of the second cell satisfies a cell reselection criteria, the mobile station apparatus selects the second cell.

As described above, since when the multimedia broadcast multicast service being received from the first cell can be continued, by selecting the second cell confirmed to be accessible, the multimedia broadcast multicast service being received from the first cell can be continued, and the reception quality of the second cell satisfies a cell reselection criteria, the mobile station apparatus selects the second cell, it becomes easy for the mobile station apparatus that is interested in the MBMS service to select a cell providing the interested MBMS service. As a result, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(f) Moreover, in the communication system of the embodiment of the present invention, the mobile station apparatus determines whether or not the multimedia broadcast multicast service being received from the first cell can be continued, by selecting the autonomously detected second cell on the basis of multimedia broadcast multicast service information received from the autonomously detected second cell.

As described above, since the mobile station apparatus determines whether or not the multimedia broadcast multicast service being received from the first cell can be continued, by selecting the autonomously detected second cell on the basis of multimedia broadcast multicast service information received from the autonomously detected second cell, it becomes easy for the mobile station apparatus that is interested in the MBMS service to select a cell providing the interested MBMS service. As a result, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(g) Moreover, in the communication system of the embodiment of the present invention, the mobile station apparatus includes a list showing multimedia broadcast multicast service providing capability of the second cell, and determines whether or not the multimedia broadcast multicast service being received from the serving first cell can be continued, by selecting the autonomously detected second cell on the basis of the list.

As described above, since the mobile station apparatus includes the list showing the multimedia broadcast multicast service providing capability of the second cell, and determines whether or not the multimedia broadcast multicast service being received from the serving first cell can be continued, by selecting the autonomously detected second cell on the basis of the list, it becomes easy for the mobile station apparatus that is interested in the MBMS service to select a cell providing the interested MBMS service. As a result, the continuity of the MBMS service is improved, thereby enabling efficient MBMS reception. Moreover, the mobile station apparatus does not need to acquire the broadcast information from the CSG cell, which simplifies the processing.

(h) Furthermore, in the communication system of the embodiment of the present invention, after selection of the second cell, the mobile station apparatus requests the selected second cell to start the multimedia broadcast multicast service being received from the first cell.

As described above, since after selection of the second cell, the mobile station apparatus requests the selected second cell to start the multimedia broadcast multicast service being received from the first cell, it becomes easy for the mobile station apparatus that is interested in the MBMS service to select a cell providing the interested MBMS service. As a result, the continuity of the MBMS service is improved, thereby enabling efficient MBMS reception. Further, since the mobile station apparatus requests the MBMS being received as needed, when transmission is not required, the base station apparatus does not need to provide the MBMS service, which increases the flexibility of scheduling.

(i) Moreover, the communication system of the embodiment of the present invention further includes a high-level control station apparatus controlling the multimedia broadcast multicast service, when start of the multimedia broadcast multicast service is requested from the mobile station apparatus, the base station apparatus requests the control station apparatus to transmit the multimedia broadcast multicast service.

As described above, since, when start of the multimedia broadcast multicast service is requested from the mobile station apparatus, the base station apparatus requests the control station apparatus to transmit the multimedia broadcast multicast service, it becomes easy for the mobile station apparatus that is interested in the MBMS service to select a cell providing the interested MBMS service. As a result, the continuity of the MBMS service is improved, thereby enabling efficient MBMS reception. Further, since the mobile station apparatus requests the MBMS being received as needed, when transmission is not required, the base station apparatus does not need to provide the MBMS service, which increases the flexibility of scheduling.

(j) Moreover, a cell reselection method of the embodiment of the present invention is a cell reselection method of a communication system including a base station managing a first cell capable of providing a multimedia broadcast multicast service, and a mobile station apparatus belonging to a group of access-restricted second cells, the mobile station apparatus selecting the second cell from the serving first cell, the method including at least the steps of: periodically transmitting the multimedia broadcast multicast service information from the base station apparatus to the mobile station apparatus; determining whether or not the multimedia broadcast multicast service being received from the first cell can be continued, by selecting the second cell confirmed to be accessible in the mobile station apparatus; determining whether or not the reception quality of the second cell satisfies cell reselection criteria when the multimedia broadcast multicast service being received from the first cell can be continued by selecting the second cell as a result of the determination; and selecting the second cell when the reception quality of the second cell satisfies the cell reselection criteria as a result of the determination.

As described above, the mobile station apparatus determines whether or not the multimedia broadcast multicast service being received from the first cell can be continued by selecting the second cell confirmed to be accessible, and when the multimedia broadcast multicast service being received from the first cell can be continued by selecting the second cell as a result of the determination, determines whether or not the reception quality of the second cell satisfies the cell reselection criteria, and when the reception quality of the second cell satisfies the cell reselection criteria as a result of the determination, selects the second cell. Thus, since it becomes easy for the mobile station apparatus that is interested in the MBMS service to select a cell providing the interested MBMS service, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(k) Furthermore, a control program of a mobile station apparatus of the embodiment of the present invention is a control program of a mobile station apparatus selecting a first cell capable of providing a multimedia broadcast multicast service or an access-restricted second cell, the control program converting a series of processing into commands so as to enable a computer to read and execute them, the series of processing including processing of: determining whether or not the multimedia broadcast multicast service being received from the serving first cell can be continued, by selecting the second cell confirmed to be accessible; determining whether or not the reception quality of the second cell satisfies cell reselection criteria when the multimedia broadcast multicast service being received from the first cell can be continued, by selecting the second cell, as a result of the determination; and selecting the second cell when the reception quality of the second cell satisfies the cell reselection criteria as a result of the determination.

As described above, the mobile station apparatus determines whether or not the multimedia broadcast multicast service being received from the serving first cell can be continued by selecting the second cell confirmed to be accessible, and when the multimedia broadcast multicast service being received from the first cell can be continued by selecting the second cell as a result of the determination, determines whether or not the reception quality of the second cell satisfies the cell reselection criteria, and when the reception quality of the second cell satisfies the cell reselection criteria as a result of the determination, selects the second cell. Thus, since it becomes easy for the mobile station apparatus that is interested in the MBMS service to select a cell providing an interested MBMS service, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

(1) In addition, an integrated circuit of the embodiment of the present invention is an integrated circuit, by being mounted in a mobile station apparatus, causing said mobile station apparatus to exhibit a series of plurality of functions including: selecting a first cell capable of providing a multimedia broadcast multicast service or an access-restricted second cell; determining whether or not the multimedia broadcast multicast service being received from the serving first cell can be continued, by selecting the second cell confirmed to be accessible; determining whether or not the reception quality of the second cell satisfies cell reselection criteria when the multimedia broadcast multicast service being received from the first cell can be continued, by selecting the second cell, as a result of the determination; and selecting the second cell when the reception quality of the second cell satisfies the cell reselection criteria as a result of the determination.

As described above, the mobile station apparatus determines whether or not the multimedia broadcast multicast service being received from the serving first cell can be continued by selecting the second cell confirmed to be accessible, and when the multimedia broadcast multicast service being received from the serving first cell can be continued by selecting the second cell as a result of the determination, determines whether or not the reception quality of the second cell satisfies the cell reselection criteria, and when the reception quality of the second cell satisfies the cell reselection criteria as a result of the determination, selects the second cell. Thereby, since it becomes easy for the mobile station apparatus that is interested in the MBMS service to select a cell providing the interested MBMS service, the continuity of the MBMS service is improved, thereby enabling efficient MBMS reception. Moreover, the base station apparatus can inform the mobile station apparatus of information necessary for the mobile station apparatus to continue the MBMS service to improve the continuity of the MBMS service.

It is to be noted that the above-mentioned embodiments are merely examples and may be variously modified and replaced. For example, this uplink transmission method can be applied to both a communication system using an FDD (frequency division duplex) method and a communication system using a TDD (time division duplex) method. In addition, for convenience of description, the mobile station apparatus and the base station apparatus in the embodiments are described with reference to the functional block diagrams. However, a program that realizes a function of each part of the mobile station apparatus and the base station apparatus or a part of the functions maybe recorded in a computer-readable medium, and the program recorded in the recording medium may be read into a computer system and executed, thereby controlling the mobile station apparatus and the base station apparatus. Note that, the "computer system" used herein includes OS and hardware such as peripheral equipment.

Moreover, the term "computer-readable recording media" refer to movable media including semiconductor media (for example, RAMs, nonvolatile memory cards, and so on), optical recording media (for example, DVDs, MOs, MDs, CDs, BDs), and magnetic recording media (for example, magnetic tapes, flexible discs), and storage devices such as disc units built in the computer system. Further, the term "computer-readable recording media" includes objects that dynamically holds a program for a short time, such as a communication line at the time when the program is transmitted via a network such as the Internet or a communication line such as a phone line, and objects that holds the program for a certain period, such as a volatile memory in a computer system as a server or a client. Moreover, the program may serve to realize a part of the above-mentioned function, or may achieve the above-mentioned function by combination with other program previously recorded in the computer system.

Furthermore, each of the functional blocks and features of the mobile station apparatus and the base station apparatus in each of the above-mentioned embodiments may be configured typically in a circuit including an LSI such as an IC (integrated circuit). In this case, the LSI may have any integration density. The functional blocks and features may be individually formed into chips, or a part or the whole of the functional blocks and features may be integrated and formed into chips. Moreover, the integrated circuit is not limited to the LSI and maybe realized as a dedicated circuit or a general-purpose processor. Furthermore, when any alternative technique of the integrated circuit for the LSI would be developed with the progress of the semiconductor technology, an integrated circuit according to the technique can be used.

Although the embodiments of the present invention have been described in detail based on specific examples, it is needless to say that the subject matter of the present invention and clams are not limited to the specific examples. That is, the statement of this description intends to illustrate the present invention by examples, and does not limit the present invention at all.

DESCRIPTION OF SYMBOLS

101 Reception section
103 Demodulation section
105 Decoding section
107 Higher layer
109 Coding section
111 Modulation section
113 RS generation section
115 MBSFN-RS generation section
117 Multiplexing section 119 Transmission section
121 Control section
123 Network signal transmission/reception section
201 Reception section
203 Demodulation section
205 Decoding section
207 Higher layer
209 Measurement processing section
211 Multicast data reception processing section
213 Random access control section
215 Coding section
217 Modulation section
219 Transmission section
221 Transmission band setting section
223 Control section

The invention claimed is:

1. A mobile station apparatus capable of receiving an MBMS service in RRC_IDLE mode, the mobile station apparatus comprising:
   a control circuit configured to and/or programmed to:
      receive system information, wherein
         the system information includes first system information and/or second system information, and
         the second system information includes an information related with the MBMS service;
      even if the MBMS service can be received on another cell based on the first system information of serving cell based on the second stem information of the another cell, consider a priority of a frequency of the another cell to be not changed; and
      perform a cell reselection based on the consideration.

2. The mobile station apparatus according to claim 1, wherein the control circuit is further configured to and/or programmed to:
   if the priority of the frequency of the another cell is to be changed, consider the priority of the frequency of the another cell to be the highest; and
   perform a cell reselection based on the consideration.

3. A communication method which is applied to a mobile station apparatus capable of receiving an MBMS service in RRC_IDLE mode, the ommunication method comprising:
   receiving system information, wherein
      the system information includes first system information and/or second system information, and
      the second system information includes an information related with the MBMS service;
   even if the MBMS service can be received on another cell based on the first system information of serving cell, based on the second system information of the another cell, considering a priority of a frequency of the another cell to be not changed; and
   performing a cell reselection based on the consideration.

4. The communication method according to claim 3, wherein the communication method further comprises:
   if the priority of the frequency of the another cell is to be changed, considering the priority of the frequency of the another cell to be the highest; and
   performing a cell reselection based on the consideration.

5. A processing device that is mounted in the mobile station apparatus, wherein
   the processing device performs the communication method according to claim 4.

6. A processing device that is mounted in the mobile station apparatus, wherein
   the processing device performs the communication method according to claim 3.

* * * * *